Jan. 8, 1935.　　　　A. A. ROSS　　　　1,987,419
RAILWAY TRUCK
Filed Sept. 28, 1932
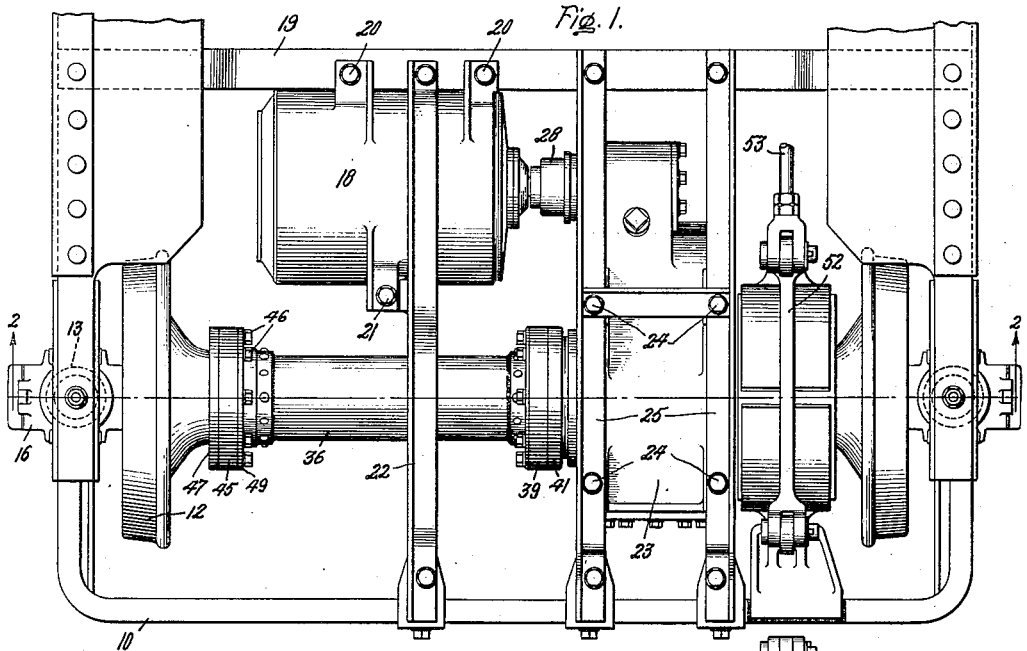
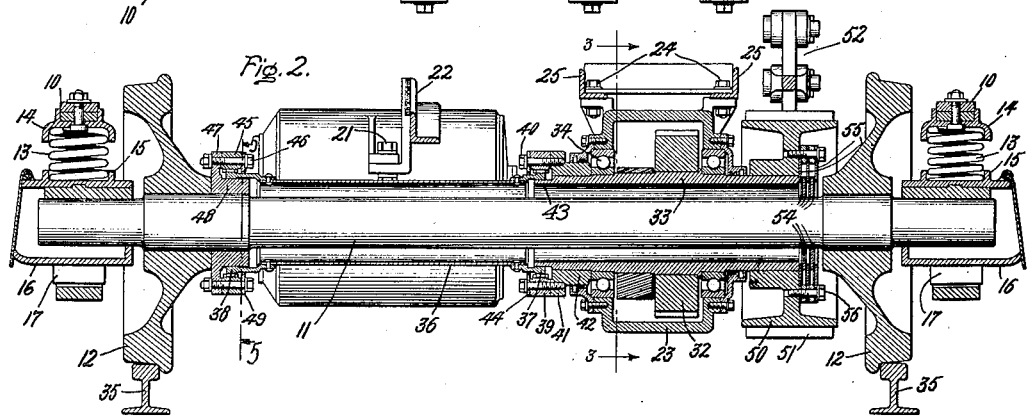
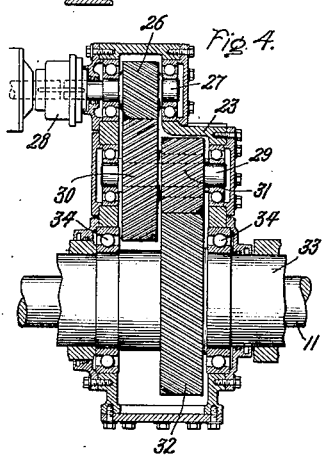
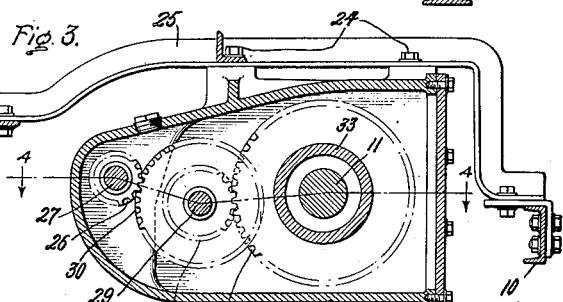
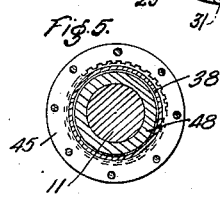
Inventor:
Aubrey A. Ross,
by Charles Mullen
His Attorney.

Patented Jan. 8, 1935

1,987,419

UNITED STATES PATENT OFFICE 1,987,419

RAILWAY TRUCK

Aubrey A. Ross, Marblehead, Mass., assignor to General Electric Company, a corporation of New York Application September 28, 1932, Serial No. 635,204

3 Claims. (Cl. 105—108)

My invention relates to railway trucks and especially to the type using a quill shaft arranged on the axle thereof for transmitting power from the driving motor to the axle.

The object of my invention is to provide an improved and simplified construction of a railway truck, wherein the vehicle frame and apparatus carried thereby are free to move relative to the axle when the vehicle passes over any irregularity in the track. I accomplish this object by providing a truck having a frame spring borne on an axle, which is coupled to a source of power carried by the frame through a quill shaft arranged about a portion of the axle, and a torque transmitting element flexibly connecting the quill shaft to the axle.

My invention will be more fully set forth in the following description referring to the accompanying drawing, and the features of novelty which characterize my invention will be pointed out with particularity in the claims annexed to and forming a part of this specification.

In the drawing, Fig. 1 is a plan view of a railway truck embodying my invention; Fig. 2 is a cross sectional view on the line 2—2 of Fig. 1, showing an axle, quill shaft and the flexible coupling; Fig. 3 is a cross-sectional view on the line 3—3 of Fig. 2, showing a reduction gear arrangement for driving the quill shaft; Fig. 4 is a cross sectional view on the line 4—4 of Fig. 3, and Fig. 5 is a section on the line 5—5 of Fig. 2.

Referring to the drawing, the railway truck, which I have illustrated embodying my invention, comprises a rectangular supporting frame 10 spring borne on the axle 11 to which the driving wheels 12 of the truck are secured. The frame 10 is spring supported on the axle 11 by coil springs 13 retained under compression between the seat 14 secured to the truck frame and a seat 15 formed in the journal boxes 16 which are arranged on the ends of the axle 11. The journal boxes are arranged in pedestal jaws 17 in the sides of the truck frame.

In order to minimize the unsprung weight of the truck I provide a motor and reduction gearing mounted on the truck frame 10 which is spring borne on the wheels and axle and flexibly coupled to the wheels and axle for driving them. In the construction illustrated in the drawing, as an example of one manner of carrying out my invention, a driving motor 18 is bolted to cross-member 19 of the truck frame, as indicated at 20, and is also bolted at 21 to a longitudinal tie-bar 22 extending between the cross-member 19 and the end of the truck frame.

The reduction gearing through which power is transmitted from the motor 18 to the axle 11 includes a housing 23 which is bolted at 24 to longitudinal tie-bars 25 extending between cross-bar 19 and the end of the truck frame, as shown in Figs. 3 and 4. This reduction gearing includes a pinion 26 mounted on a shaft 27, which is coupled to the motor shaft, as indicated at 28 in Fig. 1, and which is mounted in bearings in the sides of the housing 23. Power is transmitted from the pinion 26 to the axle 11 by gear 30 mounted on a countershaft 29 carried by the housing and a gear 31 which engages a driving gear 32 mounted on a sleeve 33 which is mounted in bearings 34 in the sides of the housing 23, the sleeve 33 being arranged on the axle 11, as shown in Figs. 2, 3 and 4. The pinion shaft 27, the countershaft 29, and the sleeve 33 are preferably mounted in ball bearings in the side walls of housing 23. The spring suspension system supporting the truck frame 10 on the axle 11 is designed so that with ordinary loading of the truck, the axle 11 is substantially coaxial with the sleeve 33, and the axis of the sleeve 33 is displaced only slightly from the axis of the axle 11 upon variations in loading of the truck.

It will be understood that when the wheels pass over any irregularity in the track 35, on which the wheels are running, the spring suspension system will cause a slight up and down movement or tilting of the truck frame with respect to the axle 11. It is, therefore, necessary to provide a suitable flexible coupling between the sleeve 33 and the axle 11 which transmit power from the sleeve and the axle when this movement occurs. I accomplish this by providing a coupling including a tube 36 about the same inside diameter as sleeve 33 having annular spur gears 37 and 38 secured to the opposite ends of the tube 36. The gear 37 is closely fitted within an annular internal gear 39 of substantially the same pitch diameter which is bolted at 40 to a flange 41 of a hub 42 rigidly secured to the sleeve 33. The gear 37 is loosely fitted on a reduced extension 43 on the sleeve 33 and is prevented from being displaced by an annular retaining plate 44. The gear 38 is closely fitted in an internal annular gear 45 of substantially the same pitch diameter which is bolted at 46 to a flange 47 of a hub 48 rigidly secured to the axle 11. The gear 38, which is loosely fitted on hub 48, is prevented from being displaced by an annular retaining plate 49. A brake drum 50 is secured to the end of the sleeve 33 opposite the gear 37 having brake shoes 51 and a lever mechanism, indicated at 52, which is actuated by the brake rod 53 to bring the brake shoes into engagement with the brake drum. In order to prevent dust and dirt entering the sleeve 33 and causing undue wear of the coupling, I provide a seal at the end of the sleeve 33 adjacent the brake drum 50 including a plurality of spaced apart annular plates 54 secured to the axle which are interleaved with a plurality of spaced apart plates 55 bolted to the brake drum at 56.

In the operation of the truck construction above described, the motor 18 transmits power to the axle 11 through the reduction gearing including pinion 26, gears 30, 31 and 32, sleeve 33 and the flexible coupling including the tube 36. Upon any movement of the truck frame 10 with respect to the axle 11, the motor 18 and the reduction gearing which are carried by the frame 10 will be moved in the same relation to the axle 11, but power will be transmitted from the motor to the axle 11 through the reduction gearing and the tube 36 in all positions of the truck frame with respect to the axle 11.

Although I have shown a particular embodiment of my invention as applied to a railway truck, I do not desire my invention to be limited to the particular arrangement described, and I intend in the appended claims to cover all modifications which do not depart from the spirit and scope of my invention.

What I claim as new and desire to secure by Letters Patent of the United States is:

1. A truck for locomotives or cars having wheels and an axle, a driving motor carried by said frame, a quill shaft driven by said motor, said quill shaft being carried by said frame and arranged about said axle, and a rigid torque transmitting element extending along said axle and having one end thereof flexibly coupled to said quill shaft and the other end thereof flexibly coupled to said axle, and a brake element carried by said quill shaft.

2. A truck for locomotives or cars having wheels and an axle, a frame spring borne on said axle, a driving motor carried by said frame, a quill shaft carried by said frame and arranged about said axle, means for coupling said motor to said quill shaft intermediate the ends thereof, means including a torque transmitting element arranged about said axle, and flexibly coupled at one end thereof to one end of said quill shaft and at the other end thereof to said axle for transmitting torque from said quill shaft to said axle, and a brake associated with the other end of said quill shaft.

3. A truck for locomotives or cars having wheels and an axle, a frame spring borne on said axle, a driving motor carried by said frame, a quill shaft arranged about said axle, means including reduction gearing connecting said motor and quill shaft for supporting said quill shaft on said frame, a torque transmitting element arranged about said axle flexibly coupled at one end thereof to said quill shaft and flexibly coupled at the other end thereof to said axle, and a brake element carried by said quill shaft.

AUBREY A. ROSS.